May 12, 1942.  A. A. STUART, JR  2,283,103
THERMIONIC INDICATOR
Filed Dec. 30, 1940
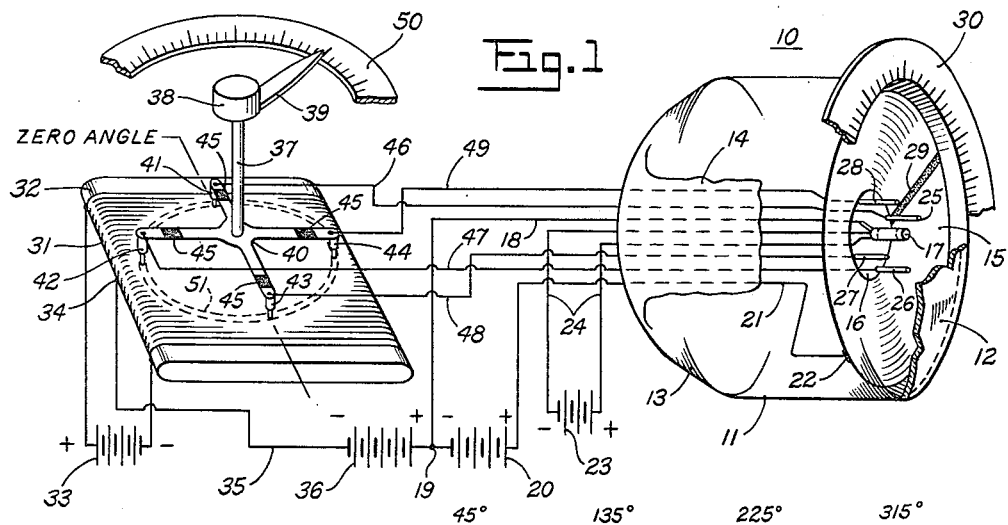
INVENTOR.
Alfred A. Stuart, Jr.
BY
David F. Moody
ATTORNEY.

Patented May 12, 1942

2,283,103

UNITED STATES PATENT OFFICE 2,283,103

THERMIONIC INDICATOR

Alfred A. Stuart, Jr., Hasbrouck Heights, N. J., assignor to Bendix Aviation Corporation, South Bend, Ind., a corporation of Delaware Application December 30, 1940, Serial No. 372,431

11 Claims. (Cl. 177—351)

This invention relates to thermionic devices and more particularly to an indicating system wherein angular rotation of a controlling element may be indicated by said thermionic device.

It is an object of the present invention to provide an indicator of angularly movable members wherein the indication may be dead beat and inertialess.

It is a further object of the invention to provide an indicating system wherein the angular position of a rotatable element may be indicated by a cathode ray beam.

Other objects of the invention include the provision of a novel thermionic device operable by a controlling element to indicate quantities on a circular scale, and also the provision of a thermionic device of novel construction wherein a cathode ray beam is utilized to indicate the motion of a controlling element.

Other objects will appear from a study of the following specification when made in conjunction with the attached drawing, throughout which like numerals designate like parts.

Fig. 1 is a circuit diagram of a novel indicating system of the present invention with certain of the elements thereof in perspective.

Fig. 2 is a graphical representation in explanation of the operation of the present invention; and Fig. 3 is a schematic diagram of a second embodiment of the present invention.

Having particular reference to Fig. 1, 10 designates an evacuated thermionic device, having a glass envelope 11 of generally cylindrical form, with a flat or slightly curved upper face 12 and a converging bottom portion 13 which terminates in a centrally disposed mass of glass forming a press 14. Toward the face 12 there is positioned an anode member 15 coated with any suitable fluorescent material and shaped as an annular member, slightly dished towards its inner diameter, having a central aperture 16. A cathode member 17 is positioned centrally of said aperture so as to be coaxial with anode 15. Cathode 17, containing thermionic emissive material, is supported by a wire conductor 18 which passes through press 14 and is connected externally at point 19 to the negative terminal of an anode battery 20. The positive terminal of battery 20 is connected to anode 15 at point 22, by means of a conductor 21 which passes into envelope 11 through press member 14.

Cathode 17 may be of the indirectly heated type having a heating filament centrally thereof, connected to a battery 23 through conductors 24, Director or control electrodes 25, 26, 27 and 28, which may be small-gauge rods, project through aperture 16, spaced slightly from the inner edge of anode 15. These four control electrodes are arranged 90 degrees apart and are equally spaced from cathode 17. A cathode ray beam 29, which is formed in a manner to be described later, will be apparent on the face of anode 15, during operation of the thermionic tube. Beam 29 is of narrow width and acts as an indicating pointer for cooperation with a scale 30, which is circular, but which is shown with parts broken away so that the construction of the device 10 may be better illustrated.

A potentiometer 31, comprising a wire coil wound on a flat form 32, has its terminals connected to a battery 33 and is center tapped at 34 to a conductor 35 which is connected to the negative terminal of a bias battery 36, the positive side of which is connected to conductor 18 at point 19. A shaft 37 extends at right angles to the surface of potentiometer 31 terminating at its far end (with respect to potentiometer 31) in a knob member 38 carrying an indicating pointer 39, and at its inner end in a spider 40 having four electrical terminals 41, 42, 43 and 44 carried thereby and insulated from each other by means of a section of insulation 45 carried on each arm of spider 40. Control electrodes 25, 26, 27 and 28 are connected to electrical terminals 41, 42, 43 and 44, respectively, by means of conductors 46, 47, 48 and 49. A circular scale 50, which is shown with parts broken away, extends coaxially of shaft 37 for cooperation with pointer 39 to show the angular position of pointer 39. When knob 38 is rotated, spider 40 will be rotated so that terminals 41, 42, 43 and 44 describe a circular path, represented by dashed lines 51.

Since coil 31 is wound on a flat form 32, the variation in voltage from the maximum to the minimum, of the contacts moving in a circular path, will follow the well known cosine law. We can consider terminals 41 and 43 to be in the zero angular position, (that is they lie in a line transverse to the direction in which the turns of coil 31 extend) and it will be seen that the number of turns of coil 31 spanned is a maximum; therefore, at the zero angle the voltage across terminals 41 and 43 is a maximum. Terminals 42 and 44 are spaced 90 degrees from terminals 41 and 43 and since they span the minimum number of turns of coil 31 in this position, the voltage across terminals 42 and 44 is a minimum. Actually these terminals will rest on the same turn of wire and if the resistance of the short section therebetween is almost zero, then the voltage across terminals 42 and 44 is almost zero. It can be shown that for the other positions of any pair of terminals, the voltage across the pair will vary in accordance with the cosine of the angle made by a line drawn between the two terminals of the pair, measured from a line at right angles to the turns of the coil, which, latter line represents the zero angle of rotation. As noted above, Fig. 1 shows terminals 41 and 43 on the zero angle.

The variation of voltage across potentiometer 31, in accordance with the cosine of the angle of rotation of shaft 37, is necessary in order that equal angles of rotation of shaft 37 will appear as equal angles of rotation of cathode ray beam 29. It has been found that in order to obtain equal angular displacements of a beam, such as cathode ray beam 29, it is necessary that the voltages on the deflection electrodes vary as the cosine of the angle through which the controlling element, such as shaft 37, is turned. Fig. 2 graphically illustrates the relation between the value of voltage (which may be called the signal voltage) from potentiometer 31 and battery 33 and the angular displacement of shaft 37 from the zero angle position.

The curves 25', 26', 27' and 28' represent the relative values of the voltages on director electrodes 25, 26, 27 and 28, respectively, through a complete revolution of shaft 37, with shaft 37 being revolved in a clockwise direction. The height of the cosine curves shown is designated as S and represents the maximum voltage taken from potentiometer 31. The height S represents the peak value of positive voltage supplied by potentiometer 31, but this positive value is changed considerably by the influence of the negative biasing voltage impressed on the control electrodes by means of battery 36. For operation of this system, in accordance with the invention, it is necessary that no more than one control electrode be positive at any time, but an inspection of Fig. 2 will show that at all points (except the 0 or 360, 90, 180 and 270 points) during a complete revolution of shaft 37, at least two directors simultaneously have a positive value (in the absence of a negative bias). If a parallel line be drawn through the 45 degree, 135 degree, 225 degree and 315 degree points, the height B, between these points and the X—X axis, will represent a certain value of voltage, above which, inspection will show, only one curve is positive at any time; therefore, by impressing the value B, in a negative, rather than a positive sense, upon directors 25, 26, 27 and 28, all points below the intersection points marked 45 degrees, 135 degrees, 225 degrees and 315 degrees will be made negative, and thus, the condition above stated for the operation of the invention, namely, that only one director at a time be positive, is fulfilled.

From zero to 45 degrees, director 25 goes from a maximum voltage of S value to zero, and from 45 to 90 degrees, the next adjacent director 26 takes control and goes from zero to maximum, then from 90 to 135 degrees it goes from a maximum to zero. The next adjacent director, namely 27, takes control and goes from zero at 135 to a maximum at 180 degrees and again to zero at 225, at which point director 28 takes control and goes from zero to a maximum at 270 and again to zero at 315 degrees. Finally at 315 degrees, director 25 rises from zero, to maximum at 360 degrees, completing one revolution of shaft 37. When any one director is positive, the static fields of all the other directors combine to suppress emission of electrons in their region while electrons are induced to flow to anode 15 in the region of the director that is positive. The electrons so flowing constitute the cathode ray beam 29, and the position of the beam with respect to a radial line passing through the positive director depends upon the cosine of the voltage of the director, and equal angular changes can be made only where the controlling voltages vary in accordance with the cosine law. It will be seen that beam 29 will be rotated equal amounts for equal angular changes of shaft 37 during the quarter revolution in which each of the director electrodes has control.

With this explanation of the variation of voltage between adjacent directors in sequence through one revolution of shaft 37, it will be readily understood that beam 29 will be turned through equal angles with shaft 37, and therefore, readings on scale 15 can be repeated at a remote point by means of beam 29 and scale 30.

The invention may be embodied in another form, as shown schematically in Fig. 3, wherein 52 represents a vacuum tube of the type shown in Fig. 1, having an anode 53, a cathode 54 and director or control electrodes 55, 56, 57 and 58. In the operation of the tube, a cathode ray beam 59 is formed on a surface of anode 53, acting as an indicating pointer for cooperation with a circular scale 60, shown with parts broken away. A motor 61, which may be the transmitting unit of a self-synchronous motor, such as an "Autosyn," is shown having a rotor 62 carried for rotation by a shaft, not shown, and a stator portion including a winding 63 and a winding 64 at right angles thereto. Stator members 63 and 64 are connected to the primaries 65 and 66 of transformers 67 and 68, respectively. The secondary 69 of transformer 67 has its terminals connected to control electrodes 55 and 57 by means of conductors 70 and 71. The secondary 72 of transformer 68 has its terminals connected to control electrodes 56 and 58 through conductors 73 and 74. The center points of secondaries 69 and 72 are connected together so as to be at the same voltage by means of a conductor 75. Rotor 62 is energized through conductors 76 by a source of alternating current, such as alternator 77. The primaries 78 and 79 of transformers 80 and 81 are connected in parallel to alternator 77 by means of the pairs of leads 82 and 83. Transformers 80 and 81 have secondaries 84 and 85, respectively, each of which has one terminal connected to ground through conductor 86. The other terminal of secondary winding 85 is connected to anode 53 through a conductor 87, while the other terminal of secondary 84 is connected to lead 75 by means of a conductor 88. Cathode 54 is connected to ground potential by means of conductor 89.

By means of the circuit shown in Fig. 3, the thermionic tube 52 may be operated entirely on alternating current (the filament, not shown, may be heated by an alternator), since the voltage relation between the anode, the cathode, the control electrodes and the external circuits connected thereto, will remain the same during all portions of an alternating current cycle. As long as the voltage relations or ratios of these voltages do remain constant (anywhere within the operating limits of tube 52, of course), the tube 52 may be operated with the same apparent results as obtained by the direct current circuit shown in Fig. 1. During the negative half cycle of current from alternator 77, anode 53 will be negative with respect to cathode 54 and therefore electrons from the cathode will not be attracted to anode 53, and cathode ray beam 86 cannot be formed. When the frequency of alternator 77 is above four or five cycles per second the eye does not notice the extinction of the beam every half cycle, due to the phenomenon of persistence of vision and due also to the tendency for fluorescence to persist on anode 15, and therefore the beam 59 will appear to be on continuously during operation of the system even though it does not exist during negative half cycles.

Secondaries 84 and 85 are so connected that during a positive half cycle of alternator 77, anode 53 is positive, and therefore, the negative end of secondary 85 is connected to ground through conductor 86. During this half cycle the positive end of secondary 84 is grounded through conductor 86, and by virtue of the connection of secondary 84 to secondaries 69 and 72, through conductor 88, a negative potential, the value of which is measured by the drop across secondary 84, is impressed equally upon each of the control electrodes 55, 56, 57 and 58. This condition prevails during the positive half cycle of alternator 77, but during the negative half cycle, when anode 53 is negative with respect to cathode 54, the polarity of the terminals of secondary 84 is reversed and the negative end is now grounded through conductor 86, and therefore, a positive potential is impressed upon the control electrodes through the center taps of transformers 69 and 72, connected to conductor 88. A resistor 90 is therefore placed in series with conductor 88 in order to limit the current drawn by control electrodes 55, 56, 57 and 58, during the negative half cycle in which they have a positive voltage impressed upon them. It is desired to limit the current flow in this condition in order to prevent destruction of the control electrodes by bombardment from the electrons in the neighborhood of cathode 54.

There is shown in Fig. 3 a means whereby the brilliance of cathode ray beam 59 may be controlled by an operator. A cylindrical control grid 91, of wire mesh or of any other suitable formation, surrounds cathode 54 and is connected to a potentiometer 92 across the secondary winding 84 by means of a conductor 93 and a variable tap 95. Tap 95 may be moved along potentiometer 92 in order to adjust the negative bias which will be imposed upon grid 91 during each positive half cycle of voltage from alternator 77. A resistor 94 may be placed in series with conductor 93 in order to limit the positive swing of voltage that will be impressed upon control grid 91 during the negative half cycle of voltage from alternator 77. By varying the position of tap 95 along potentiometer 92 the control of electrons emitted may be varied, and therefore the brilliance of cathode ray beam 59 may be easily regulated. Upon movement of tap 95 to a position imposing sufficiently high negative bias on grid 91, the beam 59 may be entirely extinguished. While a similar brilliance control may be utilized in the circuit shown in Fig. 1, it has been omitted therefrom since it was believed that the structure of tube 10 could be more clearly shown in the absence of a brilliance control.

It has been stated that cathode ray beam 59 will be formed during the positive half cycle regardless of the amount of voltage supplied by alternator 77 (within the operating limits of course of the tube 52). This is true, since, as the voltage from alternator 77 builds up in a positive direction from zero to maximum in the first half, and from maximum to zero in the second half of the positive half cycle of alternation, the anode voltage, the cathode voltage and the control electrode bias voltage will all vary accordingly so that the ratios of these different voltages are constant. As long as the ratios are constant, the angular position and width of the beam 59 will be constant for any given position of rotor 62. Obviously, these ratios will not vary if once the correct ratios are established. Once initially adjusted, no further adjustment is made to the anode voltage, the cathode voltage or control electrode bias voltage, and thus, the shape or position of beam 59 will not be affected during each positive half cycle of alternation of alternator 77.

It is characteristic of the conventional self-synchronous motor, such as an "Autosyn," that the voltage induced in the stator, (whether the stator has two coils at right angles as shown, or three coils at 120 degrees, which is the more common form) will vary in one revolution of its rotor in accordance with the cosine of the angle through which the rotor is turned. It will be seen, therefore, that transmitting "Autosyn" 61 provides the necessary law of variation of voltage, which was stressed in the explanation of Fig. 1. The number of director electrodes will vary with the "Autosyn" used, and if the "Autosyn" has three coils, then there will be six directors supplied, symmetrically connected to the "Autosyn."

The system of the present invention, particularly the embodiment shown in Fig. 3, can be used for a number of indicating purposes; for example, rotor 62 may be turned under the control of a radio loop, in which case cathode ray beam 59, in conjunction with scale 60, will indicate the bearing of a radio station in azimuth, and also rotor 62 might be turned under control of a directional gyro, in which case the cathode ray beam and scale will give indications of bearing of a carrying aircraft or ship.

While only two embodiments of the present invention have been shown in the drawing, it is to be understood that various changes may be made without departing from the scope of the present invention. For this reason, it is intended not to limit the invention by the description herein given as an example, but solely by the scope of the appended claims.

What is claimed is:

1. An indicating circuit including a thermionic device comprising an envelope, an electron-emissive cathode, an annular anode coated with fluorescent material and a plurality of control electrodes spaced between said cathode and said anode and arranged symmetrically about said cathode, an external circuit for energizing said cathode, a source of anode potential, a voltage transmitter having a rotor and a stator, connections between said stator and said control electrodes for impressing voltages on said control electrodes that vary in accordance with a determined law for a revolution of said rotor, a source of negative bias connected to said control electrodes through said stator, said negative bias being of such value with respect to the voltages impressed on said control electrodes that the flow of electrons from said cathode to said anode is restricted to a beam, which beam is rotated through equal angles with said rotor upon the turning of said rotor, to give an indication of the angular movement of said rotor.

2. An indicator in which an indicating element is a cathode ray beam, a cathode ray tube having an annular anode coated with fluorescent material, an electron-emissive cathode positioned centrally of said anode, control electrodes symmetrically spaced about said cathode, between said anode and said cathode, a rotor member externally of said tube, a stator member associated with said rotor, a source of voltage connected to said stator member, connections between said rotor member and said control electrodes for communicating voltages, in amounts that vary with the rotation of said rotor, to said control electrodes through said connections, a source of negative bias connected to said stator member and to said electrodes, a source of anode potential, said negative bias being so related to the voltage transmitted from said stator through said rotor to each of said control electrodes that emission of electrons from said cathode is directed into a narrow beam radially upon said anode, said beam being rotatable upon rotation of said rotor, to give an indication of angular movement of said rotor.

3. An indicator including a cathode ray tube having an annular anode coated with fluorescent material, an electron-emissive cathode centrally thereof, four control electrodes between said cathode and anode and spaced symmetrically about said cathode, a source of voltage for said anode, a transmitter of voltages having a connection to each of said control electrodes, said connections being made to said transmitter electrically ninety degrees apart, means associated with said transmitter to vary the voltages transmitted to said electrodes in accordance with a definite law of variation, and a source of negative bias connected to said electrodes through said transmitter, the value of said negative bias being such that emission of electrons from said cathode is restricted to a narrow cathode ray beam on said anode, said beam being rotated under control of said means, to give an indication of varying quantities.

4. An indicator including a thermionic device having a sealed envelope, an annular anode of slightly dished form coated with fluorescent material and having a central opening, an electron-emissive cathode positioned centrally of said anode, four control electrodes spaced from said cathode and said anode and arranged symmetrically about said cathode, a voltage source having a rotor element, a connection between said voltage source and each of said control electrodes, said rotor being so related to the remainder of said voltage source that the voltages on said control electrodes due to said source vary with the cosine of the angle through which said rotor may be turned, and means for biasing said control electrodes, so that at any angular position of said rotor, emission of electrons from said cathode to said anode is restricted to a narrow beam which is rotatable through equal angles upon turning of said rotor, a give an indication of the angular position of said rotor.

5. An indicator including a thermionic device having a sealed envelope, an anode of generally annular configuration coated with fluorescent material, an electron-emissive cathode centrally thereof, a plurality of control electrodes arranged symmetrically about said cathode and spaced from said anode and said cathode, an external source of voltage having a connection to each of said control electrodes, a rotor means for varying the voltages on said control electrodes, means for biasing said control electrodes, the value of the voltages on said electrodes due to said source and to said means for biasing being of such value that for every angular position of said rotor means, emission of electrons from said cathode to said anode will be restricted to a narrow beam of light indicative of the angular position of said rotor.

6. A cathode ray indicator including a thermionic tube having a generally annular-shaped anode coated with fluorescent material, an electron-emissive cathode centrally thereof, a plurality of control electrodes, spaced about said cathode and within said annular anode, a source of voltage having a connection to each of said control electrodes, means for varying the voltages on said control electrodes, and a source of bias connected to said control electrodes to restrict emission from said cathode to a narrow beam on said anode, the variations of voltage from said source under control of said means causing said beam to rotate upon said anode.

7. An indicator wherein an indicating element is a cathode ray beam, a thermionic device including a sealed envelope, a generally annular anode having its surface coated with a fluorescent material, an electron emissive cathode located centrally of said anode, a plurality of control electrodes symmetrically spaced about said cathode, a source of voltage for said anode, a source of voltage for said control electrodes, the last mentioned source having a rotor and a stator, a connection between said stator and each of said control electrodes, said connections being made at points on said stator electrically spaced by the physical spacing of said control electrodes in degrees, connections between said rotor and a source of voltage, said rotor being in inductive relation to said stator and transferring voltage thereto in accordance with a definite law of variation, and means for impressing a potential bias on said electrodes to restrict emission of electrons from said cathode to a narrow cathode ray beam on said anode, the potential bias and the voltage from said stator on each control electrode being so related that turning of said rotor is indicated by rotation of said cathode ray beam.

8. An indicating circuit including a thermionic tube having a generally annular anode coated with fluorescent material, a cathode having electron-emissive material located centrally of said anode, four control electrodes spaced ninety degrees apart, positioned between said cathode and said anode, and an alternator having a connection to said anode, a transmitter of variable voltages including a rotor connected to said alternator and a stator having two electrical windings positioned ninety electrical degrees apart, a connection between each of said control electrodes to a point on said windings separated ninety degrees electrically from each of the adjacent connections, a source of potential bias connected to said electrodes which, in conjunction with the potential from said connections, restricts emission of electrons from said cathode to a cathode ray beam on said anode, turning of said rotor being indicated by rotation of said cathode ray beam.

9. An indicating system including a rotor, the angular position of which is to be indicated, a stator inductively related to said rotor, a source of potential connected to said rotor, said stator having a plurality of windings, a cathode ray tube having an annular anode member, an electron-emissive cathode disposed centrally thereof and a plurality of control electrodes symmetrically spaced about said cathode, connections between each of said electrodes and points on stator windings separated electrically by the physical spacing, in degrees, of said control electrodes, a source of potential bias connected to said electrodes and so related to the voltages impressed on said elctrodes from said stator windings that electrons from said cathode falling upon said anode are restricted to a narrow beam, the angular position of which is indicative of the angular position of said rotor.

10. An indicator wherein an indicating element is a cathode ray beam, a dish-shaped anode having a central aperture and coated with a fluorescent material, an electron-emissive cathode positioned centrally thereof, a plurality of control electrodes spaced about said cathode, a source of positive potential for said anode, a potentiometer, a source of voltage connected across said potentiometer, a rotor member having contact arms movable on said potentiometer, a connection from each of said contact arms to said control electrodes, a source of bias potential connected to the mid-point of said potentiometer, bias therefrom being impressed on said control electrodes through said connections and being of such value with relation to the voltages impressed on said electrodes by said potentiometer, that emission of electrons from said cathode forms a narrow cathode ray beam on said anode, said contact arms moving, upon rotation of said rotor member, over points of cyclically varying potential, such movement being indicated by similar movement of said cathode ray beam.

11. A thermionic tube including an envelope of generally cylindrical shape with closed ends, an annular, slightly dished anode positioned toward one end and having fluorescent material thereon, a cathode, including electron-emissive material, projecting axially of said anode, means for connection to an external electrical source to heat said cathode, a connection from said anode to a point externally of said envelope, four control electrodes, comprising rods parallel to said cathode and within said annular anode, adjacent ones of said electrodes being spaced equally from said cathode and ninety degrees apart, and means for connecting each of said control electrodes to an external circuit.

ALFRED A. STUART, Jr.